(12) United States Patent
Lenehan et al.

(10) Patent No.: US 6,324,606 B1
(45) Date of Patent: Nov. 27, 2001

(54) APPARATUS AND METHOD FOR CONNECTING A COMPUTER TO A DOCKING STATION VIA A CABLE

(75) Inventors: Daniel J. Lenehan, Los Altos; Ram Bhuma, San Jose, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/281,254

(22) Filed: Mar. 30, 1999

(51) Int. Cl.$^7$ .................................................. G06F 13/00
(52) U.S. Cl. .............................. 710/101; 361/679
(58) Field of Search .................... 710/100–104; 361/679–686

(56) References Cited

U.S. PATENT DOCUMENTS

| | | | |
|---|---|---|---|
| 5,157,769 | * 10/1992 | Eppley et al. | 709/253 |
| 5,504,864 | * 4/1996 | Berg | 709/253 |
| 5,619,659 | * 4/1997 | Kikinis et al. | 710/101 |
| 5,689,402 | * 11/1997 | Ralston, Jr. | 361/686 |
| 5,878,211 | * 3/1999 | Delagrange et al. | 713/200 |
| 5,889,964 | 3/1999 | Cho et al. . | |
| 5,982,614 | * 11/1999 | Reid | 361/686 |
| 6,029,215 | * 2/2000 | Watts, Jr. et al. | 710/101 |
| 6,105,096 | * 8/2000 | Martinelli et al. | 710/129 |

OTHER PUBLICATIONS

Institute of Electrical and Electronics Engineers, Inc. IEEE Standard for Scalable Coherent Interface (SCI)—IEEE STD 1596–1992 Aug. 2, 1993 pp: 1–249.

Institute of Electrical and Electronics Engineers, Inc. IEEE Standard for Low–Voltage Differential Signals (LVDS) for Scalable Coherent Interface (SCI)—IEEE STD 1596.3–1996 Jul. 31, 1996 pp: 1–30.

Institute of Electrical and Electronics Engineers, Inc. IEEE Standard for High–Brandwidth Memory Interface Based on Scalable Coherent Interface Signaling Technology—IEEE STD 1596–1996 Sep. 15, 1996 pp: 1–90.

Institute of Electrical and Electronics Engineers, Inc. IEEE Standard for Shared Data Formats Optimized for Scalable Coherent Interface Processors—IEEE STD 1596.5–1993 Apr. 25, 1994 pp: 1–81.

* cited by examiner

*Primary Examiner*—Sumati Lefkowitz
(74) *Attorney, Agent, or Firm*—Blakely, Sokoloff, Taylor & Zafman LLP

(57) ABSTRACT

A cable for coupling a portable computer to a docking station is disclosed. The cable comprises a first end for coupling the cable to the docking station and a second end for coupling the cable to the portable computer. The cable also includes a lock that locks the second end to the portable computer until unlocked by a predetermined sequence.

15 Claims, 4 Drawing Sheets

APPARATUS AND METHOD FOR CONNECTING A COMPUTER TO A DOCKING STATION VIA A CABLE

FIELD OF THE INVENTION

The invention relates to docking computers, and more specifically, to a cable interconnection between a computer and a docking station.

BACKGROUND OF THE INVENTION

To decrease the weight and power requirements of portable computers, resources that are used infrequently or have relatively large power requirements are often not included in the portable computer case. These resources remain in a docking station that is typically left at a user's desk or other location where they may be used. For example, network interface circuitry is not used when a portable computer is used away from a home or office, so network interface circuitry is not required for a portable computer to be functional; however network interface circuitry is often used when the portable computer is used in a home or office environment.

Other devices, such as CD drives, may be used so infrequently when operating under battery power that the user prefers a lighter portable computer without the device may also be left out of the portable computer. Resources that are not included in the portable computer case, but which are utilized by the computer user, may be housed in a docking station that is designed to be connected to the portable computer when portability is not necessary.

Typical docking stations include a mechanical attachment device. The portable computer is actually attached into the docking station and must be detached by the docking station before the portable computer is portable. This often results in docking stations that are custom designed to fit with the case of a particular portable computer. A new docking station must be designed each time a computer manufacturer changes the case of its portable computers, which increases the cost of docking stations and slows the progress of portable computers.

Another concern with respect to docking stations is that the docking station may limit the effectiveness of the cooling elements employed by the portable computer. For example, cooling vents are typically located at the back of the portable computer and when the portable computer is attached into the docking station, the docking station often limits the flow of air to the cooling vents, which reduces the effectiveness of the cooling elements. This may restrict the circuitry, particularly the choice of processors, available for use in the portable computer.

Furthermore, typical docking stations consume desk space, which may be limited to the point of requiring that a user use a small portable computer at his or her desk. Because a docking station may take as much or more desk space as a desktop computer system, a docking station may not be feasible for some portable computer users, whereas a docking station that may be placed beneath or beside a desk may be more attractive to these users. Therefore, it would be desirable to provide an improved docking solution.

SUMMARY OF THE INVENTION

A portable computer docking solution including a docking cable is described. In one embodiment, the docking cable has a first end coupled to a docking station having devices to be used by a portable computer system and a second end to couple to a portable computer system. The docking cable has a plurality of lines to communicate low voltage differential signals between the portable computer system and the docking station. The docking cable also includes a locking mechanism controllable by software executing on the portable computer system. The locking mechanism selectively locks the portable computer system to the docking cable.

In an alternative embodiment, a network access device has a network interface to access the network, an output interface to provide output signals to a display device, and a port to receive a docking cable. The docking cable has a plurality of lines to communicate low voltage differential signals between the network access device and an external device. The docking cable further includes a locking mechanism controllable by software executing on the network access device. The locking mechanism selectively locks the network access device to the external device.

BRIEF DESCRIPTION OF THE DRAWINGS

The invention is illustrated by way of example, and not by way of limitation, in the figures of the accompanying drawings and in which like reference numerals refer to similar elements and in which.

DETAILED DESCRIPTION

A computer-docking station interface is described. In the following description, for the purposes of explanation, numerous specific details are set forth in order to provide a thorough understanding of the present invention. It will be apparent, however, to one skilled in the art that the invention may be practiced without these specific details. In other instances, well-known structures and devices are shown in block diagram form in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Generally, the computer docking station interface comprises a cable that couples a portable computer with a docking station that provides access to resources for use with the portable computer. In the invention, the cable is capable of transmitting data at a high bandwidth over multiplexed lines, such that the pin count of the cable is reduced from that of a non-multiplexed cable. The cable also comprises a locking mechanism controlled by software that prevents the cable from being removed prior to the time when the software prepares the portable computer for separation from the docking station.

Figure 1:
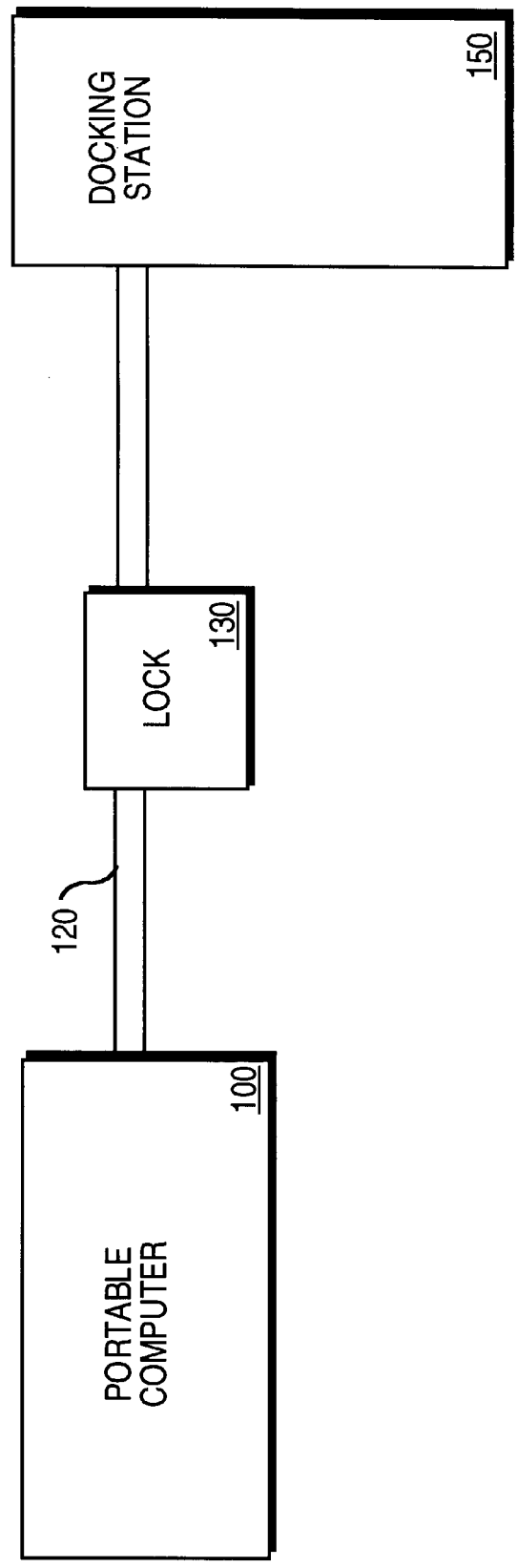
FIG. 1 is one embodiment of a block diagram of an apparatus for docking a portable computer with a docking station according to the present invention.

FIG. 1 is one embodiment a block diagram of an apparatus for docking a portable computer with a docking station according to the present invention. Generally, portable computer 100 is coupled to docking station 150 via cable 120. Cable 120 also includes lock 130 that locks cable 120 to portable computer 100.

Portable computer 100 may be any portable (e.g., notebook, laptop) computer that a user may wish to couple to a docking station. Portable computer 100 has an interface compatible with cable 120. According to one embodiment, portable computer 100 and cable 120 have a 30 pin connection interface; however, other configurations may also be used. By having a standard interface which is common to many computers, cable 120 may be used to couple many different computers to docking station 150. Thus, a new docking station is not required for each portable computer case, as is typically required in the prior art.

Docking station 150 may provide access to any number of devices to which portable computer 100 may be attached. For example, docking station 150 may contain containing a floppy disk drive, a hard disk drive and/or a CD-ROM drive. Other devices may also be used included in docking station 150. According to one embodiment, cable 120 is permanently attached to docking station 150; however, cable 120 may be coupled using a 30-pin connection or other interface.

Cable 120 is a high bandwidth multiplexed cable that allows the number of pins to be reduced compared to a non-multiplexed cable. According to one embodiment, the cable is designed according to the Low Voltage Differential Signaling (LVDS) technology as described in IEEE standard 1596.3-1996 "LVDS for Scalable Coherent Interface (SCI)" Published Jul. 31, 1996. According to one LVDS embodiment, a 30-pin connection PCI standard bus and sideband signals are propagated over a cable that may be up to 25 feet long. However, other multiplexed transmission schemes may also be used.

Lock 130 locks cable 120 to portable computer 100 when cable 120 is coupled to portable computer 100. In one embodiment, lock 130 is controlled by the operating system running on portable computer 100. The operating system engages lock 130 until the user executes a program through the operating system that prepares portable computer 100 for undocking. To prepare for undocking, the operating system, for example, saves files and settings as necessary and communicates to devices and networks that portable computer 100 is to be removed from its connection. Other software control can also be provided for lock 130.

In one embodiment, the operating system controls an electromechanical locking device that prevents portable computer system 100 from being detached from cable 120. For example, the operating system can prepare computer system 100 for undocking (e.g., by saving files accessed on remote storage devices) prior to releasing computer system 100 form cable 120. In an alternative embodiment, computer system 100 is not physically locked to cable 120, but the operating system informs the user when computer system 100 can be undocked safely.

In one embodiment, lock 130 is for compliance with docking requirements of the operating system running on the portable computer. For example, operating systems available from Microsoft Corp. specify certain requirements of the docking connection in order to guarantee file integrity. Thus, lock 130 operates in conjunction with the operating system of the portable computer to prevent undocking prior to the time when the operating system has prepared portable computer 100 and necessary files for decoupling from the docking station.

Figure 2:
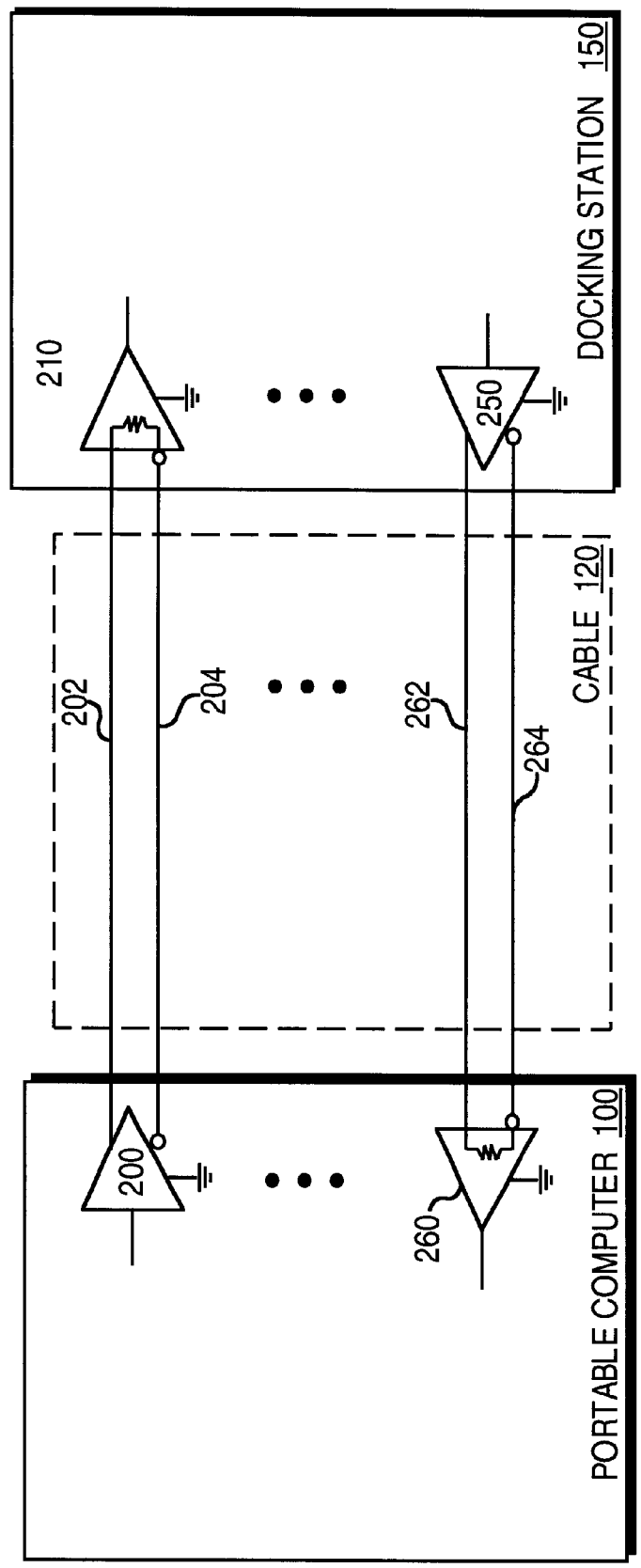
FIG. 2 is one embodiment of a low-voltage differential signal (LVDS) interface according to the present invention.

FIG. 2 is one embodiment of a LVDS interface. The LVDS interface comprises a series of differential signal lines. Thus, both portable computer 100 and docking station 150 include both drivers and receivers. For simplicity, lock 130 is not shown in FIG. 2.

Low voltage differential signal embodiments provide several advantages over single-ended transmission schemes. For example, low voltage swings (<400 mV in one embodiment) provide for very high-speed switching and low power dissipation. Differential signals reduce the area between the signal and return paths and cancel electromagnetic fields through use of equal and opposite current flow. Further, differential signals are relatively immune to external noise and produce little noise to interfere with other signals.

The embodiment of FIG. 2 provides a plurality of LVDS drivers and receivers, whereby data is communicated in a source-synchronous manner. The embodiment is unidirectional because the driver is always at one end of the link and the receiver is always at the other end of the link. The drivers are differential because each driver provides two outputs that are equal in magnitude and opposite in sign. The interface is sourcesynchronous because a clock or other timing signal is sent along with the data to be communicated as if it were another data bit.

Referring to FIG. 2, Portable computer 100 includes a plurality of drivers (e.g., 200) and receivers (e.g., 260). Similarly, docking station 150 also contains a plurality of drivers (e.g., 250) and receivers (e.g., 210). When docked via cable 120, the drivers of portable computer 100 are coupled corresponding receivers in docking station 150 and the drivers of docking station 150 are coupled to corresponding receivers in portable computer 100. Corresponding drivers and receivers are coupled by a pair of lines included in cable 120, such as lines 202 and 204 that couple driver 200 to receiver 210. In order to prevent noise reflected by a driver from becoming a differential signal, the output impedance of the inverting outputs and the non-inverting outputs is closely matched.

Each receiver contains a terminating resistor that has a resistance approximately equal to the impedance of the line coupling the corresponding driver and receiver. This value is typically approximately 100 ohms. Also, the ground to which each driver and receiver is coupled should be within approximately 1 volt of each other.

Because the interface between portable computer 100 and docking station 150 is source synchronous, data transmitted over cable 120 is sampled and aligned with the clock of the receiving component (e.g., portable computer 100 or docking station 150). To do this, data that is transmitted over cable 120 is sampled in response to the transitions of the signal transmitted on the clock signal line. According to one embodiment, data is sampled on both the rising and falling edges of the clock signal. Data is then stored in receiving latches until accessed by the receiving component.

Figure 3:
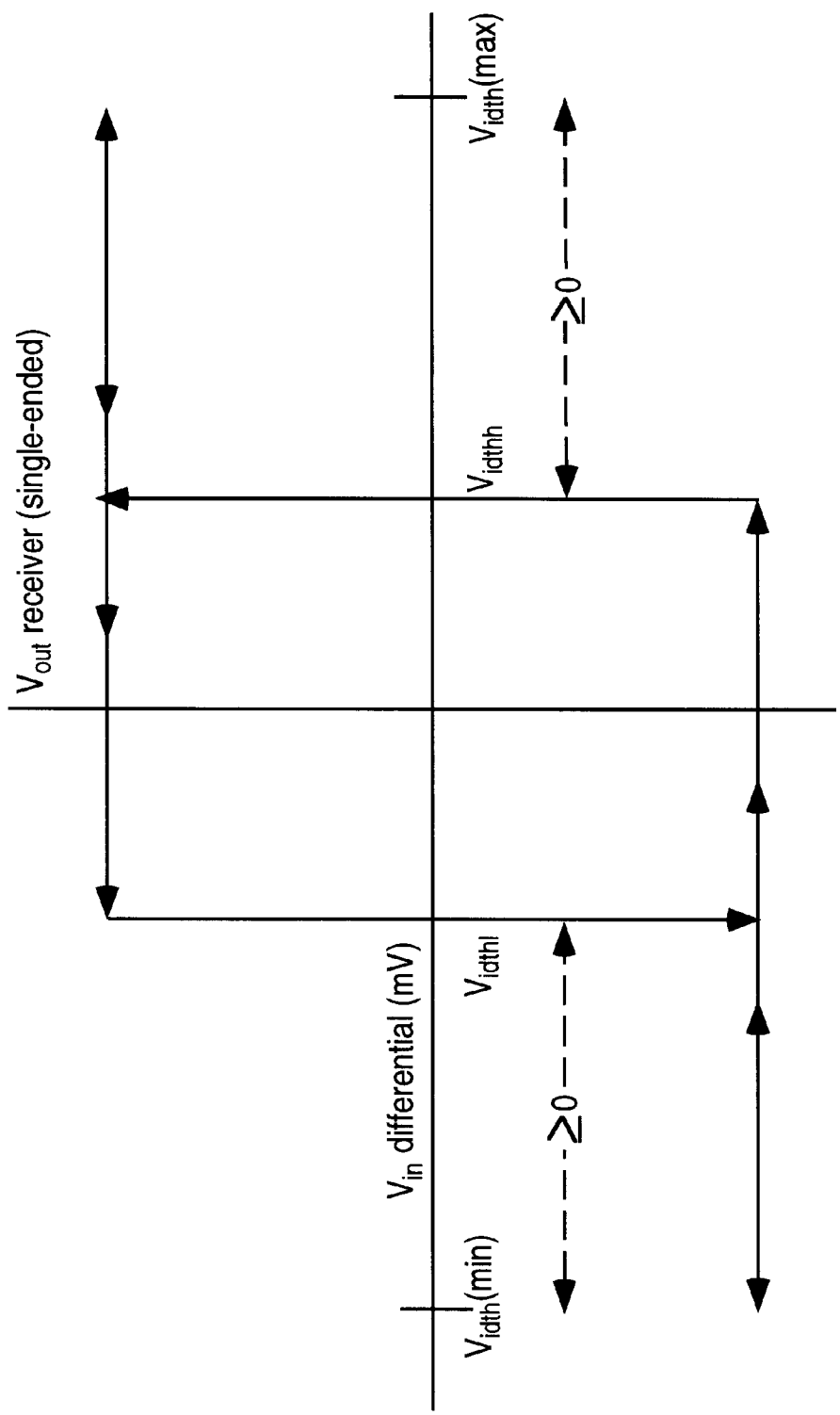
FIG. 3 is a hysteresis diagram for one embodiment of receivers according to the present invention.

FIG. 3 is a hysteresis diagram for one embodiment of receivers according to the present invention. Hysteresis in the receivers of the invention prevent undefined input signals that occur, for example, due to disconnecting the receiver inputs or powering down the corresponding driver, from causing an oscillating output from the receiver.

In FIG. 3, $V_{out}$ represents a single-ended output from the receiver. $V_{idthl}$ and $V_{idthh}$ represent the low and high input differential threshold voltages, respectively. These are the differential input voltages that cause the output of the receiver transitions to output low and high voltages, respectively. $V_{idth}(\min)$ and $V_{idth}(\max)$ are the minimum and maximum differential input voltages that can be used as inputs to the receiver. According to one embodiment, the hysteresis voltage ($V_{hyst}=V_{idthh}-V_{idthl}$) is 25 mV. The hysteresis voltage represents the differential voltage input to the receiver below which the output of the receiver does not change.

Figure 4:
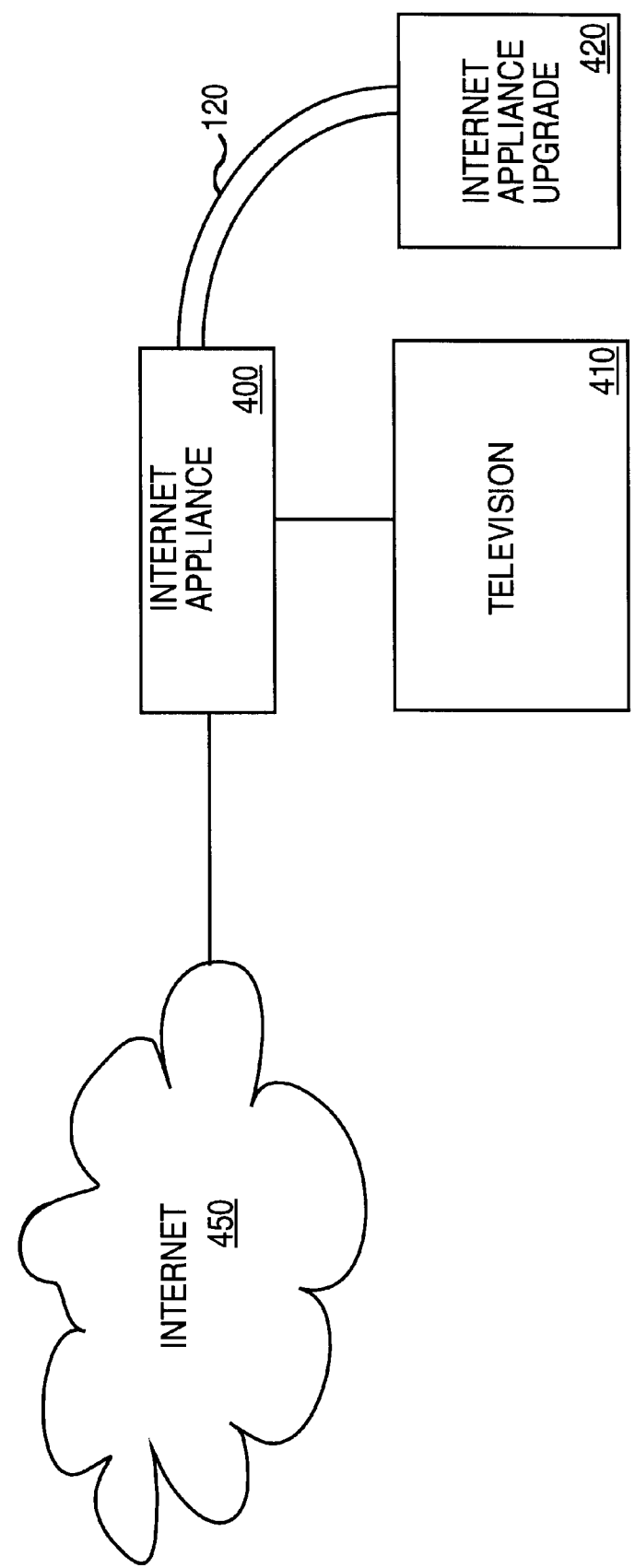
FIG. 4 is one embodiment of an upgradable Internet appliance with an upgrade connected via a cable according to the present invention.

FIG. 4 is one embodiment of an upgradable Internet appliance with an upgrade connected via a cable according to the present invention. Internet appliance 400 is connected to television 410 or other monitor and to Internet 420. Internet appliance 400 provides access to Internet 420 via television 410 without requiring a full computer system. Thus, Internet appliance 400 may provide inexpensive access to Internet 420.

Eventually, a user of Internet appliance 400 may wish to upgrade by connecting a larger hard disk, a floppy disk drive, or other device. These devices may be located in Internet appliance upgrade 420, which is coupled to Internet appliance 400 via cable 120. Cable 120 (including lock 130, not shown) is the same cable discussed above. Thus, additional devices may be connected to Internet appliance 400 without replacing or opening Internet appliance 400.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A docking cable comprising:
    a first end coupled to a docking station providing access to multiple devices to be used by a portable computer system;
    a second end to couple to a portable computer system, wherein the docking cable has a plurality of lines to communicate low voltage differential signals between the portable computer system and the docking station; and
    a locking mechanism controllable by software to be executed by the portable computer system, the locking mechanism to selectively lock the portable computer system to the docking cable.

2. The docking cable of claim 1 wherein the low voltage differential signals between the portable computer system and the docking state are multiplexed.

3. The docking cable of claim 1 wherein the low voltage differential signals provide a source synchronous interface between the portable computer system and the docking station.

4. The docking cable of claim 1 wherein the docking cable comprises a 30-pin connection between the portable computer system and the docking station.

5. The docking cable of claim 4 wherein PCI standard bus signals and sideband signals are communicated between the portable computer system and the docking station.

6. An apparatus for coupling a portable computer system to a docking station, the apparatus comprising:
    means for providing a low voltage differential signal connection between the docking station and the portable computer system, the low voltage differential signal connection to provide access to multiple devices coupled to the docking station; and
    means for locking the portable computer system in connection with the docking station, wherein the means for locking is controllable by software executing on the portable computer system.

7. The apparatus of claim 6 wherein the low voltage differential signals between the portable computer system and the docking state are multiplexed.

8. The apparatus of claim 6 wherein the low voltage differential signals provide a source synchronous interface between the portable computer system and the docking station.

9. The apparatus of claim 6 wherein the docking cable comprises a 30-pin connection between the portable computer system and the docking station.

10. The apparatus of claim 9 wherein PCI standard bus signals and sideband signals are communicated between the portable computer system and the docking station.

11. A network access device comprising:
    a network interface to access a network; and
    a port to receive a docking cable, the docking cable having a plurality of lines to communicate low voltage differential signals between the network access device and multiple external devices through an interface, the docking cable further comprising a locking mechanism controllable by software executing on the network access device, the locking mechanism to selectively lock the network access device to the interface.

12. The network access device of claim 11 wherein the low voltage differential signals between the network access device and the interface are multiplexed.

13. The network access device of claim 11 wherein the low voltage differential signals provide a source synchronous interface between the network access device and the interface.

14. The network access device of claim 11 wherein the docking cable comprises a 30-pin connection between the network access device and the interface.

15. The network access device of claim 14 wherein PCI standard bus signals and sideband signals are communicated between the network access device and the interface.

* * * * *